Lyman Fay's Improved Sifter or Strainer

111623

PATENTED FEB 7 1871

Witnesses,
Sylvanus B. Fay
Samuel M. Brown Jr.

Inventor,
Lyman Fay

UNITED STATES PATENT OFFICE.

LYMAN FAY, OF FALL RIVER, MASSACHUSETTS.

IMPROVEMENT IN SIFTERS AND STRAINERS.

Specification forming part of Letters Patent No. 111,623, dated February 7, 1871.

*To all whom it may concern:*

Be it known that I, LYMAN FAY, of Fall River, in the county of Bristol and State of Massachusetts, have invented certain Improvements in Sifters and Strainers for Flour, Sauce, &c., of which the following is a full, clear, and exact description, reference being had to the accompanying drawings, making part of this specification, in which—

Figure 1:
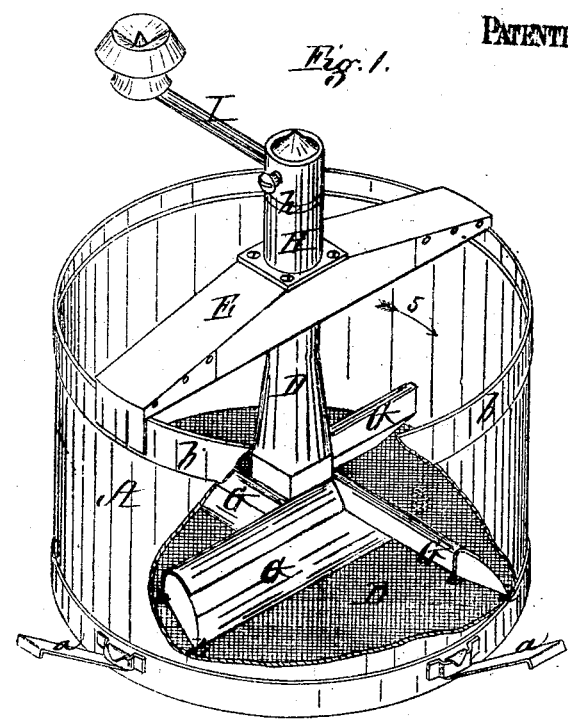
Figure 2:
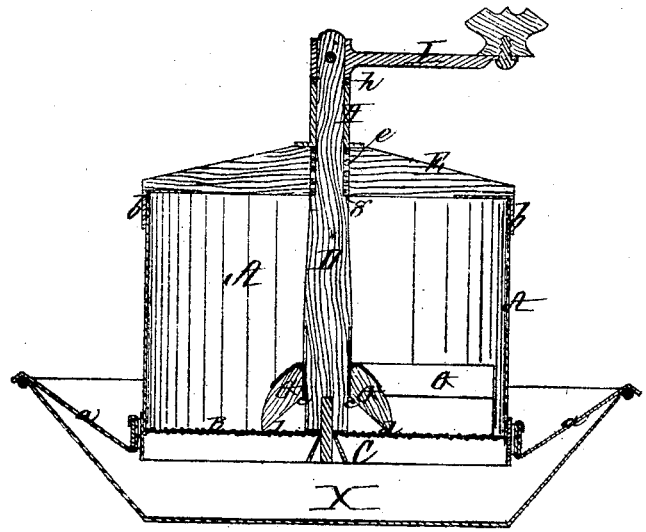

Figure 1 is a perspective view of my improved sifter or strainer. Fig. 2 is a vertical section through the center of the same.

The object of my invention is to produce a sifter or strainer for flour, sauce, &c., which can be furnished at a low cost, and will perform its work in a rapid and effectual manner; and it consists in a receptacle provided with a sieve, a revolving shaft provided with a series of arms, and a spring for pressing the latter down upon the sieve; and my invention also consists in a series of hooks projecting from the sides of the receptacle, for supporting it upon the pan which receives the flour or other article after being sifted.

To enable others skilled in the art to understand and use my invention, I will proceed to describe the manner in which I have carried it out.

In the said drawings, A is a cylindrical case or receptacle, which is intended to be supported by hooks *a* upon a pan, X, Fig. 2. The bottom of the receptacle A is provided with a sieve, B, and a cross-bar, C, which serves as a bearing for the lower end of a vertical shaft, D, the upper end of which passes through and is made to revolve within a cross-bar, E, at the top of the band or portion *b*, which is made removable.

To the foot of the shaft D are secured four radial arms, G G, of the form shown in section, Fig. 2, being inclined downward and outward from *c* to *d*. These arm, when revolved in the direction of the arrow 5, serve to agitate and pulverize the flour and force it through the sieve, the inclination of the arms tending to direct and throw the flour down under their lower edges, by which the lumps of flour are broken as required.

*e* is a spiral spring which surrounds the shaft near its top, and is confined between a shoulder, *g*, and the bottom of a guide-tube, H, through which the shaft passes, a crank, I, being provided for the purpose of revolving it and the arms G G. The spring serves to force the radial arms down upon the sieve, but allows them to rise and pass over any hard substance with which they may come in contact, thereby preventing injury to the sieve. Between the crank and the top of the guide-tube H is a washer, *h*, which may be removed, when the arms become worn from continued use, to allow the spring to press the arms down upon the sieve.

It is evident that my improved sifter may also be used as a strainer for pumpkin, squash, and various sauces.

What I claim as my invention, and desire to secure by Letters Patent, is—

The combination and arrangement of the spring *e* with the cross-bar E and shaft D, with its arms G G, the receptacle A, and hooks *a a*, operating substantially in the manner and for the purpose set forth.

Witness my hand this 7th day of January, A. D. 1870.

LYMAN FAY.

In presence of—
 SYLVANUS B. FAY,
 SAMUEL M. BROWN, Jr.